United States Patent
Chandrasekaran et al.

(10) Patent No.: US 12,552,732 B2
(45) Date of Patent: Feb. 17, 2026

(54) CYCLOPROPANATED SANDALWOOD TYPE COMPOUNDS

(71) Applicant: Symrise AG, Holzminden (DE)

(72) Inventors: Vijayanand Chandrasekaran, Holzminden (DE); Bernd Hölscher, Halle (DE)

(73) Assignee: Symrise AG, Holzminden (DE)

( * ) Notice: Subject to any disclaimer, the term of this patent is extended or adjusted under 35 U.S.C. 154(b) by 437 days.

(21) Appl. No.: 18/044,536

(22) PCT Filed: Sep. 20, 2021

(86) PCT No.: PCT/EP2021/075833
§ 371 (c)(1),
(2) Date: Mar. 8, 2023

(87) PCT Pub. No.: WO2022/058595
PCT Pub. Date: Mar. 24, 2022

(65) Prior Publication Data
US 2023/0365483 A1    Nov. 16, 2023

(30) Foreign Application Priority Data

Sep. 18, 2020   (WO) ................. PCT/EP2020/076140

(51) Int. Cl.
*C07C 33/12* (2006.01)
*A61K 8/34* (2006.01)
*A61Q 13/00* (2006.01)
*A61Q 19/10* (2006.01)

(52) U.S. Cl.
CPC ............... *C07C 33/12* (2013.01); *A61K 8/34* (2013.01); *A61Q 13/00* (2013.01); *A61Q 19/10* (2013.01)

(58) Field of Classification Search
CPC ................................ C07C 33/05; C07C 33/12
See application file for complete search history.

(56) References Cited

U.S. PATENT DOCUMENTS 6,284,929 B1 *   9/2001   Baigrowicz ............. C07C 31/13
                                                              568/445
7,777,084 B2      8/2010   Schroder

FOREIGN PATENT DOCUMENTS

| DE | 3441902 C1 | 1/1986 |
| EP | 0 801 049 B1 | 11/2001 |
| JP | H08268940 A | 10/1996 |
| JP | H10036298 A | 2/1998 |
| JP | 2012-521409 A | 9/2012 |
| WO | 2017024126 A1 | 2/2017 |
| WO | 2020098927 A1 | 5/2020 |

OTHER PUBLICATIONS

H. Surburg, et al., 2016, "Common fragrance and flavor materials", 6th edition Wiley-VCH. 382 pages.
Christian Chapuis, et al., 2006, "Analogues of α-campholenal (=1R)-2,2,3-trimethylcyclopent-3-ene-1-acetaldehyde as building blocks for (+)-β-necrodol (=(1S,3S)-2,2,3-trimethyl-4-methylenecyclopentanemethanol) and sandalwood-like alcohols1", Helvetica Chimica Acta, vol. 89, pp. 2638-2653.
Simon Cotton, Sep. 1, 2010 "Sandalwood", Education in Chemistry, 3 pages.

* cited by examiner

*Primary Examiner* — Medhanit W Bahta
(74) *Attorney, Agent, or Firm* — McDonnell Boehnen Hulbert & Berghoff LLP

(57) ABSTRACT

The invention is in the field of fragrances and relates to novel fragrance compounds according to general formula (I) derived from campholenic aldehyde with a sandalwood-based note and improved acid stabilities. Furthermore, the present invention also relates to fragrance compositions comprising one or more of the inventive compounds. Moreover, the invention relates to the use of these compounds or fragrance compositions as an odorant or for improving the fixation of a fragrance compound or a fragrance composition as well as for the preparation of a perfumed product. In addition, the present invention thus also refers to the use of said compounds or compositions for the preparation of a perfumed products as well as perfumed products as such.

10 Claims, 1 Drawing Sheet

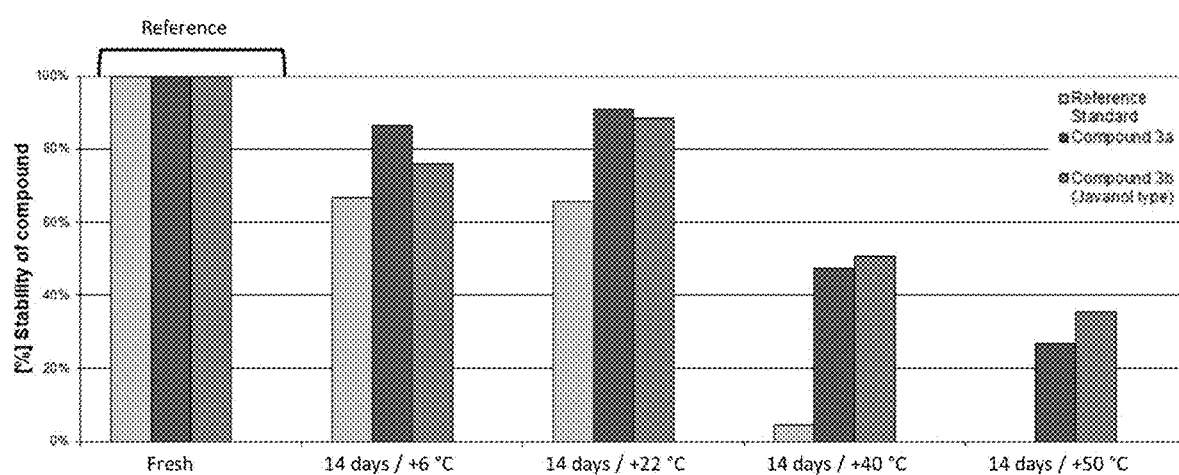

CYCLOPROPANATED SANDALWOOD TYPE COMPOUNDS

CROSS-REFERENCE TO RELATED APPLICATIONS

This application is the US national phase under 35 U.S.C. § 371 of International Application No. PCT/EP2021/075833, filed Sep. 20, 2021, which claims priority to International Application No. PCT/EP2020/076140, filed Sep. 18, 2020, the contents of each of which are hereby incorporated by reference in their entirety.

FIELD OF THE INVENTION

The invention is in the field of fragrances and relates to novel fragrance compounds according to general formula (I) derived from campholenic aldehyde with a sandalwood-based note and improved stabilities towards acidic conditions. Furthermore, the present invention also relates to fragrance compositions comprising one or more of the inventive compounds. Moreover, the invention relates to the use of these compounds or fragrance compositions as an odorant or for improving the fixation of a fragrance compound or a fragrance composition as well as for the preparation of a perfumed product. In addition, the present invention thus also refers to the use of said compounds or compositions for the preparation of perfumed products as well as said perfumed products as such.

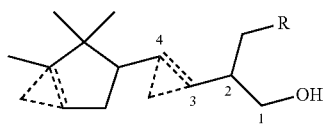

Formula (I)

PRIOR ART

Sandalwood is one of the oldest known and still one of the most popular fragrance materials used in the fragrance industry. It was originally produced in India, Ceylon and Indonesia by extraction from sandalwood trees. In order to meet the high demand and in light of the worldwide decline of the natural sources for sandalwood oil, a large number of synthetically produced fragrances with a comparable odour profile were produced within the last years.

Often, α-campholene aldehyde (2,2,3-trimethyl-3-cyclopenteneacetaldehyde, $C_{10}H_{16}O$) serves as starting material for these so-called "campholene sandalwood" aroma chemicals.

For example, DE 3441902 C1 discloses β,γ-unsaturated 2,2,3-trimethylcyclo-pent-3-enyl derivatives obtained by reduction of the aldol condensation products of the campholene aldehyde and aliphatic aldehydes using sodium borohydride and their use as odorants, especially when combined with the corresponding α,β-unsaturated alcohols. It was found that these compounds exhibit a woody-animal and soft-fruity odour.

It was further found that the sandalwood odour is sensitive to slight structural changes and that for example the tenacity of the fragrance material can be increased by cyclopropanation.

For instance, EP 0 801 049 B1 describes novel odorants derived from campholenic aldehyde comprising at least one cyclopropane ring in the molecule and the side chain being either saturated or unsaturated and containing one double bond in position α,β or β,γ, respectively. The molecules obtained therein exhibit various woody-odour aspects, with most of them exerting a sandalwood odour, but some being also woody/amberlike in dependence of the cyclopropanation. It was further found that [1-methyl-2-[(1,2,2-trimethyl-3-bicyclo[3.1.0]hexanyl)methyl]cyclo-propyl]methanol (also known as Javanol®, Givaudan), and in particular one specific diastereomer thereof, has a natural, strong and persistent sandalwood odour.

WO 2017/024126 A1 refers to a processes for cyclopropanation of substituted alkenes using dihalomethane for the preparation of flavour or fragrance ingredients and discusses the efficient preparation of said fragrance material [1-methyl-2-[(1,2,2-trimethyl-3-bi-cyclo[3.1.0]hexanyl) methyl]cyclopropyl]methanol (Javanol®, Givaudan).

However, the quest for synthetic substances smelling similar to sandalwood is presently still high and additionally, new fragrance compounds with comparable secondary olfactory properties such as elevated tenacity, low odour threshold value, elevated impact, i.e., odour intensity, and substantivity as well as sufficient chemical stability, preferably being superior to the properties of natural sandalwood oil, are all sought after.

In particular, sufficient chemical stability is required in order to guarantee the stability of the fragrance material within product formulations and thus of the perfumed product as such and in turn to ensure a high product quality with consistent odour (i.e. high odour-stability). Degradation of the fragrance materials might cause undesired off-notes, a change in colour and the like. It is further known that specific fragrance materials are not stable over the whole pH range, such as in acidic environment, making the incorporation of specific fragrances difficult in acidic formulations such as the formulation of toilet cleaners, limiting the applicability of these fragrance materials. Not only the incorporation of these fragrance compounds into acidic product formulations might be challenging, but also their use as an odorant or in fragrance compositions as such, as the human skin surface exhibits an acidic pH-value being on average below 5. The fragrance material should therefore not react with the skin or degrade and thus cause changes in the olfactory and secondary properties of the fragrance material and the like.

However, it was found that Javanol® (Givaudan) is not chemically stable under acidic conditions.

The primary object of the present invention is thus to provide new sandalwood fragrance compounds which exhibit a high chemical stability, in particular a high stability in acidic environment, while simultaneously showing elevated olfactory properties closely resembling the odour profile of natural sandalwood oil, and simultaneously showing improved fixation/tenacity.

It has now been surprisingly found that the new α-campholene aldehyde-based compounds according to the general formula (I) comprising at least one cyclopropane substituent have a pronounced natural, balanced and intense sandalwood oil odour as well as a high chemical stability in acidic environment and enhanced tenacity, thus providing for excellent fragrance materials suitable for a broad range of applications.

SUMMARY OF THE INVENTION

In a first aspect, the present invention relates to a compound of general formula (I):

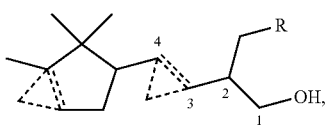

Formula (I)

wherein
R represents H or an alkyl group, preferably R represents H or a methyl group;
wherein at the positions of the dotted lines there is independently either a single bond, a C=C double bond or a cyclopropane ring; and
wherein the compound comprises at least one cyclopropane ring;
or a mixture of the above compounds;
or a stereoisomer of the above compounds or a mixture of these stereoisomers.

In a second aspect, the present invention relates to a fragrance composition comprising at least one compound according to the invention and at least one further fragrance substance.

In a third aspect, the present invention relates to the use of a compound according to the invention or the use of a fragrance composition comprising a compound according to the invention as an odorant or fragrance compound or for improving the fixation of a fragrance compound or a composition comprising a fragrance compound or for the preparation of a perfumed product.

In another aspect, the present invention relates to a perfumed product comprising a compound according to the invention or the fragrance composition comprising a compound according to the invention.

In yet another aspect, the present invention relates to a perfumed product comprising a compound according to the invention or the fragrance composition comprising a compound according to the invention in an effective amount, and a carrier or substrate.

Finally, the present invention relates to a perfumed product as defined comprising a compound according to the invention or the fragrance composition comprising a compound according to the invention, wherein the perfumed product is a perfume oil, perfume base, formulation for personal hygiene, cleaning agent or air freshener.

The inventors have now established that the new cyclopropanated compounds according to general formula (I) comprising at least one cyclopropane functionalization, and more specifically preferably comprising one or two cyclopropane functionalization(s), have a pronounced sandalwood-like odour with woody, green, floral and fruity notes along with remarkably low odour threshold values and high tenacities. Moreover, the compounds according to the invention show an improved chemical stability under acidic conditions (and increased temperatures) allowing for the provision of efficient fragrance materials or fragrance components suitable for various applications amongst others the incorporation as fragrance ingredient in acidic formulations.

FIGURES

The FIGURE: Comparison of the chemical stability of the inventive compounds of general formula (I) and commercially available [1-methyl-2-[(1,2,2-trimethyl-3-bi-cyclo [3.1.0]hexanyl)methyl]cyclopropyl]methanol (Javanol®, Givaudan) under acidic conditions.

DETAILED DESCRIPTION OF THE INVENTION

In accordance with the invention, the above object is achieved by a compound of general formula (I):

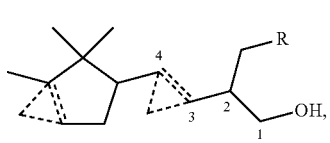

Formula (I)

wherein
R represents a hydrogen atom (H) or an alkyl group, preferably R represents H or a methyl group ($CH_3$);
wherein at the positions of the dotted lines there is independently either a single bond, a C=C double bond or a cyclopropane ring; and
wherein the compound comprises at least one cyclopropane ring;
or a mixture of the above compounds;
or a stereoisomer of the above compounds or a mixture of these stereoisomers.

The compounds of general formula (I) have an outstanding, balanced and characteristic odour profile closely resembling the odour profile of natural sandalwood oil with woody, floral, green and fruity notes as well as remarkable tenacities. The fruity and green aspects are not observed in sandalwood fragrances of the state of the art, resulting in a more complex and natural odour profile. It should be noted that also natural sandalwood oil note is the result of a number of different odorous notes reminiscent in turn of santalol, cedarwood oil or guaiac wood oil, or of sweet, balsamic, slightly ambery, spicy or animal notes or even of those milky notes reminiscent of freshly boiled milk. However, commercially sandalwood fragrances are generally described to have a rather deep and warm woody scent with soft, creamy and sweet notes and not as complex as natural sandalwood oil. None of the currently available synthetic fragrance materials from the sandalwood family exhibits such fresh nuances as those found for the substances according to the invention. Based on the additional fruity and green nuances the presently developed compounds are suitable for the use as alternative fragrance materials with enhanced secondary properties and elevated and complex, balanced and thus more natural odour profiles adding green and fruity accords which can be advantageously incorporated into a wide range of formulations to create a more fresh and vibrant scent. Thus, the present invention affords green and fruity notes together with woody sandal, which is special and not observed in the past or until now.

Moreover, the compounds described herein have a high olfactory intensity even when used in low concentrations. In addition, the compounds according to the invention convince by an outstanding chemical stability, especially under acidic conditions (and increased temperatures) as well as by their high tenacities. Therefore, these compounds are highly suitable as fragrances or in fragrance mixtures and for their use in preparations comprising these fragrances or fragrance mixtures.

It was surprisingly found that the position of the functionalization within the butyl chain has a major influence on the chemical stability of the product. Best stabilities and simultaneously best olfactory properties (tenacity, intensity, threshold values) where found for substances, where the cyclopropane functionalization(s) is/are located at a position as indicated in the general formula (I).

Thereby, the butyl chain C1 to C4 in the general formula (I) is defined as a four-carbon chain. In the general formula (I), the butyl chain is the n-butyl chain —CH$_2$—CH$_2$—CH$_2$—CH$_2$— which connects at one of the two terminal carbon atoms to the cyclopentane ring and on the other terminal carbon atom (i.e. the carbon atom marked as C1) to an hydroxyl group (—OH group).

In the general formula (I), R represents either H or an alkyl group.

Preferably, the alkyl group is selected from the group consisting of a methyl or a higher straight or branched alkyl chain such as an ethyl, propyl, n-butyl or iso-butyl group. More preferably, the alkyl group is either H or a methyl group as these result in compounds having a more natural and intense sandalwood fragrance as well as enhanced intensities and chemical stabilities. These compounds exhibit increased chemical stabilities and the most balanced and natural sandalwood-like odour profiles with green and fruity notes.

Therefore, in a preferred variant, the compound of general formula (I) comprises a methyl group attached to the butyl chain C1 to C4 in position C2 as the substituent R.

It was further surprisingly found that these compounds exhibit a natural sandalwood-like odour and are chemically stable over a wide temperature range in acidic environment, and in particular at temperatures around room temperature (RTP).

However, the best combination of olfactory properties (odour profile, substantivity and intensities/odour detection thresholds) and chemical stabilities was achieved for embodiments of formula (I), wherein R represents a hydrogen rest (H). Due to the exceptionally low threshold, exceptionally efficient fragrance materials can be provided on the basis of the present invention.

Therefore, in yet another even preferred variant, the compound of general formula (I) comprises a hydrogen rest attached to the butyl chain C1 to C4 in position C2 as the substituent R.

Irrespective of the above (i.e. of R), in general formula (I) at the position of the dotted lines in the butyl chain C1 to C4 and/or in the cyclopentane ring, there is independently from each other either a C—C single bond, a C=C double bond or a cyclopropane ring. The dotted lines are the most concise way of expressing these options in the structural formula. The meaning is also evident to the skilled person and embodiments thereof can be identified from the examples.

However, the compound of general formula (I) comprises at least one cyclopropane ring resulting in enhanced tenacities and more pronounced sandalwood-like odour profiles, with fruity and green notes and high chemical stability under acidic conditions.

Preferably, however, the compound of general formula (I) comprises two cyclopropane rings at both positions indicated as dotted lines, i.e. both positions indicated by dotted lines can represent a cyclopropane functionalization, allowing for increased tenacities and intensities while ensuring an elevated odour profile with fresh accents.

Therefore, in a preferred variant, the present invention refers also to a compound according to the first aspect and more specifically according to general formula (II):

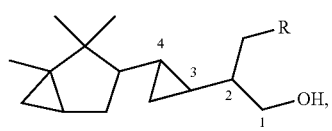

Formula (II)

wherein
R represents H or an alkyl group, preferably R represents H or a methyl group;
or a mixture of the above compounds;
or a stereoisomer of the above compounds or a mixture of these stereoisomers.

Thereby, the substituent R can have the functionalities indicated above. However, the best olfactory results and stabilities were achieved for compounds wherein R represents either H or a methyl group. It was further found that R should preferably represent a hydrogen atom, resulting in a more sandalwood-like odour profile with fresh green and fruity notes. Thus, a further particularly preferred embodiment of the present invention concerns compounds of formula (I), wherein R represents a hydrogen atom.

It was found that compounds exhibiting two cyclopropane functions result in extraordinarily high chemical stabilities in acidic environment as well as excellent odour detection threshold values (in the following abbreviated as "ODT" values). Moreover, the inventors could establish that these molecules exhibit a predominantly sandal, woody, green, floral, fruity and creamy as well as intense odour profile with elevated tenacities. Therefore, a particularly preferred embodiment of the present invention describes a compound of general formula (II), wherein the molecule is dicyclopropanated, i.e., wherein at the position of the dotted lines within the cyclopentane ring, as well as the butyl chain C1 to C4 of general formula (I), there is a cyclopropane functionalization.

In another preferred variant, the compound of general formula (I) is monocyclopropanated, i.e., the compound according to general formula (I) comprises only one cyclopropane ring at one of the positions of the dotted lines, i.e., either at the distal end of the molecule within the bulky cyclopentane moiety or in proximal position within the C1 to C4 butyl chain of the molecule. In these cases, at the position of the other dotted lines respectively which thus do not represent the cyclopropanation, there is either a C—C single bond or a C=C double bond.

However, in a preferred variant, the monocyclopropanated compound according to the invention comprises a C=C double bond at the position of the other dotted lines indicated in the molecule.

Therefore, in a preferred variant, the present invention refers to a compound according to general formula (I) wherein at the positions of the dotted lines within the C1 to C4 butyl chain there is a C=C double bond, while at the position of the dotted lines within the cyclopentane moiety there is a cyclopropane ring.

Thus, in a preferred variant of the present invention a compound according to the first aspect and more specifically according to general formula (III) is described:

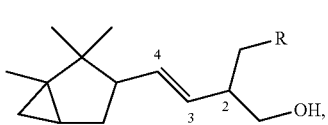

Formula (III)

wherein
R represents H or an alkyl group, preferably R represents H or a methyl group;
or a mixture of the above compounds;
or a stereoisomer of the above compounds or a mixture of these stereoisomers.

Thereby, the substituent R can have the functionalities indicated above. However, best olfactory results and stabilities were achieved when R represents either H or a methyl group, wherein R=H is preferred. In compounds according to general formula (III), wherein R represents a hydrogen rest the resulting odour profile is more intense and exhibits more fresh green and fruity notes resulting in a more complex and pleasant scent. In addition, for these compounds lower ODT values were observed, allowing for achieving more efficient fragrance materials.

Moreover, it was found that these compounds have a sandalwood-like, woody, green and fruity odour profile with high odour intensity and tenacity while simultaneously showing high chemical stabilities under acidic conditions.

In an alternative variant of the present invention, the compound of general formula (I) comprises a cyclopropane ring at the position of the dotted lines within the C1 to C4 butyl chain and a C=C double bond at the position of the dotted lines within the cyclopentane moiety.

Therefore, an alternative variant of the present invention refers to a compound according to the first aspect and more specifically according to general formula (IV):

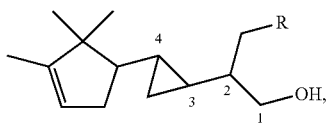

Formula (IV)

wherein
R represents H or an alkyl group, preferably R represents H or a methyl group;
or a mixture of the above compounds;
or a stereoisomer of the above compounds or a mixture of these stereoisomers.

Thereby, the substituent R can have the functionalities indicated above. However, best olfactory results and stabilities were achieved when R represents either H or a methyl group. Comparable to the compounds of general formula (III), for the compounds of general formula (IV) best primary and secondary olfactory properties were observed if R represents a hydrogen rest.

Also, these compounds were found to show excellent primary and secondary fragrance properties in terms of olfactoric profile and chemical stability in acidic environment.

Consequently, in a preferred variant, the compounds of general formula (I) comprise at least two functional groups selected from the group consisting of:
(a) cyclopropane rings and
(b) double bonds,
while the compound comprises at least one cyclopropane function according to formulas (II), (III) or (IV), respectively.

An alternative variant of the present invention relates to monofunctionalized compounds according to general formula (I) such as the compounds according to general formula (V):

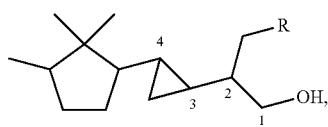

Formula (V)

wherein
R represents H or an alkyl group, preferably R represents H or a methyl group;
or a mixture of the above compounds;
or a stereoisomer of the above compounds or a mixture of these stereoisomers.

Thereby, the substituent R can have the functionalities indicated above. However, best olfactory results and stabilities were achieved when R represents either H or a methyl group, and even more preferred H. Comparable to the compounds of general formula (III) and (IV), for the compounds of general formula (V) best primary and secondary olfactory properties were observed if R represents a hydrogen rest.

Moreover, it was found that said monofunctionalized compounds showing at least one cyclopropane functionality exhibit extraordinary olfactory and secondary properties. Compound according to the above formula (V) exhibit an intense odour which can be described as cedarwood, sandalwood, creamy.

In another alternative embodiment of the present invention, the monocyclopropanated compounds exhibit a cyclopropane functionality within the bulky cyclopentane moiety, likewise showing excellent perfuming properties.

It is known that campholenic aldehyde (campholene aldehyde) may comprise a chiral centre and as such may exist as isomerically pure forms or in any mixture of its stereoisomers, in particular enantiomers, as a function of the particular isomerism of the alpha-pinene used as the starting material for preparing it. This implies that the compounds derived from campholenic aldehyde (campholene aldehyde) can also occur in different stereoisomeric forms. Consequently, whenever reference is made in the present description to a compound of general formula (I), this is deemed to refer to all stereoisomers, in particular to all enantiomers, indifferently to the isomerically pure stereoisomers or mixtures of any of their stereoisomers. For economic reasons it is preferred to use the compounds as mixtures of their stereoisomers, in particular mixtures of their enantiomers. The same is true for compounds of general formula (II), (III) and (IV) as well as the monofunctionalized compounds of general formula (V).

The compounds of general formula (I) and according to formulas (II), (III) and (IV) as well as (V) are thus present in the form of:
(a) a pure optically active enantiomer;
(b) a racemic mixture of the enantiomers; or
(c) an optically active mixture of various enantiomers.

Therefore, the present invention also discloses a mixture of any of the above compounds and/or a mixture of any of the above stereoisomers as well as the use of such compounds and/or mixtures in the meaning of the present application.

Moreover, in this context, the present invention also discloses the single isomeric forms of the compounds according to general formula (I) and more specifically general formulas (II), (III), (IV) and/or (V). The single isomeric forms of the compound according to general formula (II) are exemplarily shown in the following:

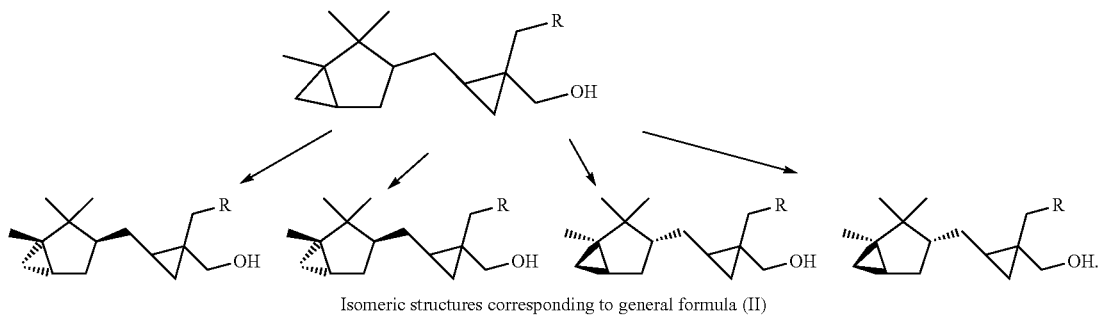

Isomeric structures corresponding to general formula (II)

Analogously, the single isomeric structures can be derived for the compounds of general formula (I), (III) and (IV) as well as compound (V).

Generally, in the context of the present invention, the term "compounds of formula (I)" means both, the individual compounds of formula (I) (as well as their isomeric forms) and all mixtures of the compounds (and isomeric forms) of formula (I) in any mixing ratio. That is to say, statements in the following description concerning "compounds of formula (I)" apply both, to a single compound of formula (I), a single isomeric form and to mixtures consisting of or comprising compounds of formula (I) and their isomeric forms in any mixing ratio. The same definitions apply to compounds of formula (II), (III) and/or (IV) and/or (V). Therefore, the present invention relates to the compounds according to the invention as such individually as well as to mixtures of the compounds according to the invention.

In addition, at the position of chain branching, i.e. at the position of the C-atom marked as C2, and C3 of general formulas (I) to (V) there can be an additional chiral centre. Moreover, with reference to general formula (I), and in particular to formula (III) or (IV) and the C=C double bond contained therein, the compound is optionally present in the form of geometric isomers, i.e. in Z- and/or E-configuration.

The compounds of general formula (I) unexpectedly possess intense and balanced odorous properties (primary properties), in particular a strong and balanced sandalwood note which closely resembles the complexity of the natural woody odour profile of sandalwood with fresh green and fruity notes and simultaneously exhibits a high chemical stability under acidic conditions. In particular, the new alcohols of general formula (I) and more specifically the alcohols of general formulas (II), (III) and (IV) as well as the monofunctionalized compounds of general formula (V) exhibit an intense and natural sandalwood-based, woody, green and fruity odour profile combined with a surprisingly elevated tenacity.

In particular, compounds of general formula (II) show natural and intense sandalwood notes with fresh green and fruity accents. Moreover, these compounds exhibit extremely high intensities and high chemical stabilities in acidic environment. Therefore, compounds of general formula (II) are of particular interest for use as fragrance compounds and the preparation of perfumed products, and especially in acidic formulations.

Among the novel compounds of general formula (I) those compounds, having a cyclopropane functionalization at both the positions indicated by dotted lines, i.e. compounds according to general formula (II), have a particular intense sandalwood-based note with low ODT values, high tenacities and high chemical stability under acidic conditions which are superior compared to commercially available cyclopropanated sandalwood-type fragrance materials such as Javanol® (Givaudan). Consequently, these compounds exhibit superior primary and secondary properties required in order to provide for an excellent fragrance material. This fact may appear astonishing in view of the similarity which exists among the molecular structures of the novel compounds of the general formula (I), and in particular general formula (II) and those of the prior art, but the odour of a compound is highly sensitive to structural variations.

Therefore, these dicyclopropanated compounds are especially preferred within the scope of the present invention as indicated above.

A direct comparison of the corresponding ODT values of the dicyclopropanated compounds according to general formula (I), and more specifically according to general formula (II) wherein R represents either a hydrogen atom (compound 3b) or a methyl group (compound 3a) and Javanol® (Givaudan) shows, that the inventive compounds exhibit comparable or even better threshold values compared to commercially available sandalwood-fragrances (see Table 1).

The odour detection threshold is defined as the lowest concentration of a certain odorous compound (gaseous and sensorially active substance) which is perceivable and thus which can be distinguished with certainty from a blank reference under standard conditions. Generally, lower ODT values are preferred as a lower amount of the corresponding fragrance compound is required in order to a achieve an intense odour impressions and thus overall lower amounts can be used for perfuming. However, as the threshold depends on various factors such as concentration, solubility, partition coefficient between air and the olfactory active substance, vapor pressure and the like, predictions referring to the ODT of a substance, i.e. a fragrance material are difficult to make. The ODT was measured using an olfactometer TO8 and a panel of at least four experts according to DIN standard EN 13725.

Surprisingly, it was found that the compounds of general formula (I), and more specifically of general formula (II) emanate a natural complex sandalwood-like odour with high strength/intensity. In particular preferred in view of the outstanding intensities are compounds according to general formula (II) wherein R represents a hydrogen atom (compound 3b).

In comparison with the commercially available dicyclopropanated sandalwood fragrance substance Javanol® (Givaudan), compound 3b exhibits a substantially lower threshold value by the factor of about 6.5 and is thus distinguished by its high intensity. Hence, lower amounts of the compound are necessary to achieve a comparably intense, natural woody and sandalwood-like note. Consequently, the inventive compound is more efficient as fragrance material.

TABLE 1

Comparison of the ODT values of the inventive compounds (compounds 3a and 3b) according to general formula (I) and commercially available Javanol ® (Givaudan).

| Compound | ODT [ppm (v/v)] |
|---|---|
| No. 3a | 0.000244 |
| No. 3b | 0.0000165 |
| Javanol ® | 0.000104 |

* ODT: odour detection threshold

Therefore, according to Table 1 presently compound 3b according to general formula (II) is the most preferred compound in view of its extraordinary ODT values and high tenacity.

The compounds of general formula (I) as well as general formulas (II) to (V) according to the invention can either be used as individual substances or in mixtures with at least one other known fragrance substance selected from an extensive range of natural and synthetic substances available in a large number of fragrance mixtures and/or in admixture with one or more ingredients or excipients conventionally used in conjunction with odorants in fragrance compositions, for example carrier materials and other auxiliary agents commonly used in the art.

The olfactory properties of the novel compounds according to general formula (I), and more specifically according to general formulas (II), (III) and (IV) as well as the monofunctionalized compounds of general formula (V) harmonize with a multitude of natural or synthetic fragrance substances. Hence, they can be advantageously used for the preparation of fragrance compositions comprising at least one compound according to the invention and at least one further fragrance substance, especially in view of their high tenacity and low threshold values in order to create long-lasting and intense fragrance composition with interesting but natural novel and original fragrance notes. In particular, the presently described compounds can be advantageously used to add more fresh notes with green and fruity accents to various formulations thus resulting in more fresh, vibrant and more balanced odour profiles compared to commercial sandalwood-based products which are rather warm and heavy. In addition, the present compounds allow for formulations comprising natural acidic ingredients such as essential oils like citrus oil having a pH of about 5 to 5.8 due to their enhanced chemical stability under acidic conditions.

Therefore, in a second aspect, the present invention refers to a fragrance composition comprising at least one compound according to the invention and at least one further fragrance substance.

The following specified fragrance substances can be used, either as individual substances or in mixtures with at least one, two, three or even more fragrance substances, in a large number of fragrance mixtures, selected from an extensive range of natural and synthetic substances.

Fragrance substances which are advantageously suitable for combining are listed for example in S. Arctander, Perfume and Flavor Materials, volumes I and II, Montclair, N.J. 1969, private publication, and/or in H. Surburg, J. Panten, Common Fragrance and Flavor Materials, 6th edition, Wiley-VCH, Weinheim 2016. The following list comprises examples of known odorant substances which are advantageously suitable for combining with the inventive compounds and mixtures thereof:

extracts of natural raw materials such as essential oils, concretes, absolutes, resins, resinoids, balsams, tinctures such as for example:

ambergris tincture; amyris oil; angelica seed oil; angelica root oil; anise oil; valerian oil; basil oil; tree moss absolute; bay oil; artemisia oil; benzoin resin; bergamot oil; beeswax absolute; birch tar oil; bitter almond oil; savory oil; buchu leaf oil; cabreuva oil; cade oil; calamus oil; camphor oil; cananga oil; cardamom oil; cascarilla oil; cassia oil; cassie absolute; castoreum absolute cedar leaf oil; cedarwood oil; cistus oil; citronella oil; lemon oil; copaiba balsam; copaiba balsam oil; coriander oil; costus root oil; cumin oil; cypress oil; davana oil; dill weed oil; dill seed oil; eau de brouts absolute; oak moss absolute; elemi oil; tarragon oil; eucalyptus citriodora oil; eucalyptus oil; fennel oil; pine-needle oil; galbanum oil; galbanum resin; geranium oil; grapefruit oil; guaiac wood oil; gurjun balsam; gurjun balsam oil; helichrysum absolute; helichrysum oil; ginger oil; iris root absolute; iris root oil; jasmine absolute; calamus oil; blue camomile oil; Roman camomile oil; carrot seed oil; cascarilla oil; pine-needle oil; spearmint oil; caraway oil; labdanum oil; labdanum absolute; labdanum resin; lavandin absolute; lavandin oil; lavender absolute; lavender oil; lemongrass oil; lovage oil; distilled lime oil; pressed lime oil; linaloe oil; Litsea cubeba oil; bay leaf oil; mace oil; marjoram oil; mandarin oil; massoia bark oil; mimosa absolute; ambrette oil; musk tincture; muscatel sage oil; nutmeg oil; myrrh absolute; myrrh oil; myrtle oil; clove leaf oil; clove bud oil; neroli oil; olibanum absolute; olibanum oil; opopanax oil; orange blossom absolute; orange oil; origanum oil; palmarosa oil; patchouli oil; perilla oil; Peru balsam oil; parsley leaf oil; parsley seed oil; petitgrain oil; peppermint oil; pepper oil; pimento oil; pine oil; pennyroyal oil; rose absolute; rosewood oil; rose oil; rosemary oil; Dalmatian sage oil; Spanish sage oil; sandalwood oil; celery seed oil; spike lavender oil; star anise oil; styrax oil; tagetes oil; fir needle oil; tea tree oil; turpentine oil; thyme oil; Tolu balsam; tonka absolute; tuberose absolute; vanilla extract; violet leaf absolute; verbena oil; vetiver oil; juniper berry oil; cognac oil; wormwood oil; wintergreen oil; ylang ylang oil; hyssop oil; civet absolute; cinnamon leaf oil; cinnamon bark oil, and fractions thereof or constituents isolated therefrom;

individual fragrance substances from the group comprising hydrocarbons, such as for example: 3-carene; alpha-pinene; beta-pinene; alpha-terpinene; gamma-terpinene; p-cymene; bisabolene; camphene; caryophyllene; cedrene; farnesene; limonene; longifolene; myrcene; ocimene; valencene; (E,Z)-1,3,5-undecatriene; styrene; diphenylmethane;

aliphatic alcohols, such as for example: hexanol; octanol; 3-octanol; 2,6-dimethylheptanol; 2-methyl-2-heptanol; 2-methyl-2-octanol; (E)-2-hexenol; (E)- and (Z)-3-hexenol; 1-octen-3-ol; mixtures of 3,4,5,6,6-pentamethyl-3,4-hepten-2-ol and 3,5,6,6-tetramethyl-4-methyleneheptan-2-ol; (E,Z)-2,6-nonadienol; 3,7-dimethyl-7-methoxyoctan-2-ol; 9-decenol; 10-undecenol; 4-methyl-3-decen-5-ol;

aliphatic aldehydes and the acetals thereof, such as for example: hexanal; heptanal; octanal; nonanal; decanal; undecanal; dodecanal; tridecanal; 2-methyloctanal;

2-methylnonanal; (E)-2-hexenal; (Z)-4-heptenal; 2,6-dimethyl-5-heptenal; 10-undecenal; (E)-4-decenal; 2-dodecenal; 2,6,10-trimethyl-9-undecenal; 2,6,10-trimethyl-5,9-undecadienal; heptanal diethylacetal; 1,1-dimethoxy-2,2,5-trimethyl-4-hexene; citronellyloxyacetaldehyde; 1-(1-methoxypropoxy)-(E/Z)-3-hexene;

aliphatic ketones and the oximes thereof, such as for example: 2-heptanone; 2-octanone; 3-octanone; 2-nonanone; 5-methyl-3-heptanone; 5-methyl-3-heptanone oxime; 2,4,4,7-tetramethyl-6-octen-3-one; 6-methyl-5-hepten-2-one;

aliphatic sulphur-containing compounds, such as for example: 3-methylthio-hexanol; 3-methylthiohexyl acetate; 3-mercaptohexanol; 3-mercaptohexyl acetate; 3-mercaptohexyl butyrate; 3-acetylthiohexyl acetate; 1-menthen-8-thiol;

aliphatic nitriles, such as for example: 2-nonenoic acid nitrile; 2-undecenoic acid nitrile; 2-tridecenoic acid nitrile; 3,12-tridecadienoic acid nitrile; 3,7-dimethyl-2,6-octadienoic acid nitrile; 3,7-dimethyl-6-octenoic acid nitrile;

esters of aliphatic carboxylic acids, such as for example: (E)- and (Z)-3-hexenyl formate; ethyl acetoacetate; isoamyl acetate; hexyl acetate; 3,5,5-trimethylhexyl acetate; 3-methyl-2-butenyl acetate; (E)-2-hexenyl acetate; (E)- and (Z)-3-hexenyl acetate; octyl acetate; 3-octyl acetate; 1-octen-3-yl acetate; ethyl butyrate; butyl butyrate; isoamyl butyrate; hexyl butyrate; (E)- and (Z)-3-hexenyl-isobutyrate; hexyl crotonate; ethyl isovalerate; ethyl-2-methyl pentanoate; ethyl hexanoate; allyl hexanoate; ethyl heptanoate; allyl heptanoate; ethyl octanoate; ethyl-(E,Z)-2,4-decadienoate; methyl-2-octinate; methyl-2-noninate; allyl-2-isoamyloxyacetate; methyl-3,7-dimethyl-2,6-octadienoate; 4-methyl-2-pentyl-crotonate;

acyclic terpene alcohols, such as for example: citronellol; geraniol; nerol; linalool; lavandulol; nerolidol; farnesol; tetrahydrolinalool; tetrahydrogeraniol; 2,6-dimethyl-7-octen-2-ol; 2,6-dimethyloctan-2-ol; 2-methyl-6-methylene-7-octen-2-ol; 2,6-dimethyl-5,7-octadien-2-ol; 2,6-dimethyl-3,5-octadien-2-ol; 3,7-dimethyl-4,6-octadien-3-ol; 3,7-dimethyl-1,5,7-octatrien-3-ol; 2,6-dimethyl-2,5,7-octatrien-1-ol; and the formates, acetates, propionates, isobutyrates, butyrates, isovalerates, pentanoates, hexanoates, crotonates, tiglinates and 3-methyl-2-butenoates thereof;

acyclic terpene aldehydes and ketones, such as for example: geranial; neral; citronellal; 7-hydroxy-3,7-dimethyloctanal; 7-methoxy-3,7-dimethyloctanal; 2,6,10-trimethyl-9-undecenal; geranyl acetone; and the dimethyl and diethyl acetals of geranial, neral, 7-hydroxy-3,7-dimethyloctanal;

cyclic terpene alcohols, such as for example: menthol; isopulegol; alpha-terpineol; terpinenol-4; menthan-8-ol; menthan-1-ol; menthan-7-ol; borneol; isoborneol; linalool oxide; nopol; cedrol; ambrinol; vetiverol; guaiol; and the formates, acetates, propionates, isobutyrates, butyrates, isovalerates, pentanoates, hexanoates, crotonates, tiglinates and 3-methyl-2-butenoates thereof;

cyclic terpene aldehydes and ketones, such as for example: menthone; isomenthone; 8-mercaptomenthan-3-one; carvone; camphor; fenchone; alpha-ionone; beta-ionone; alpha-n-methyl ionone; beta-n-methyl ionone; alpha-isomethyl ionone; beta-isomethyl ionone; alpha-irone; alpha-damascone; beta-damascone; beta-damascenone; delta-damascone; gamma-damascone; 1-(2,4,4-trimethyl-2-cyclohexen-1-yl)-2-buten-1-one; 1,3,4,6,7,8a-hexahydro-1,1,5,5-tetramethyl-2H-2,4a-methanonaphthalen-8(5H)-one; 2-methyl-4-(2,6,6-trimethyl-1-cyclohexen-1-yl)-2-butenal; nootkatone; dihydronootkatone; 4,6,8-megastigmatrien-3-one; alpha-sinensal; beta-sinensal; acetylated cedarwood oil (methylcedryl ketone);

cyclic alcohols, such as for example: 4-tert-butylcyclohexanol; 3,3,5-trimethylcyclohexanol; 3-isocamphylcyclohexanol; 2,6,9-trimethyl-Z2,Z5,E9-cyclododecatrien-1-ol; 2-isobutyl-4-methyltetrahydro-2H-pyran-4-ol;

cycloaliphatic alcohols, such as for example: alpha-3,3-trimethylcyclohexylmethanol; 1-(4-isopropylcyclohexyl)ethanol; 2-methyl-4-(2,2,3-trimethyl-3-cyclopent-1-yl)butanol; 2-methyl-4-(2,2,3-trimethyl-3-cyclopent-1-yl)-2-buten-1-ol; 2-ethyl-4-(2,2,3-trimethyl-3-cyclopent-1-yl)-2-buten-1-ol; 3-methyl-5-(2,2,3-trimethyl-3-cyclopent-1-yl)-pentan-2-ol; 3-methyl-5-(2,2,3-trimethyl-3-cyclopent-1-yl)-4-penten-2-ol; 3,3-dimethyl-5-(2,2,3-trimethyl-3-cyclopent-1-yl)-4-penten-2-ol; 1-(2,2,6-trimethylcyclohexyl)pentan-3-ol; 1-(2,2,6-trimethylcyclohexyl)hexan-3-ol;

cyclic and cycloaliphatic ethers, such as for example: cineole; cedryl methyl ether; cyclododecyl methyl ether; 1,1-dimethoxycyclododecane; (ethoxymethoxy)cyclododecane; alpha-cedrene epoxide; 3a,6,6,9a-tetramethyldodecahydronaphtho[2,1-b]furan; 3a-ethyl-6,6,9a-trimethyldodeca-hydronaphtho[2,1-b]furan; 1,5,9-trimethyl-13-oxabicyclo[10.1.0]trideca-4,8-diene; rose oxide; 2-(2,4-dimethyl-3-cyclohexen-1-yl)-5-methyl-5-(1-methylpropyl)-1,3-dioxane;

cyclic and macrocyclic ketones, such as for example: 4-tert-butylcyclohexanone; 2,2,5-trimethyl-5-pentylcyclopentanone; 2-heptylcyclopentanone; 2-pentylcyclopentanone; 2-hydroxy-3-methyl-2-cyclopenten-1-one; 3-methyl-cis-2-penten-1-yl-2-cyclopenten-1-one; 3-methyl-2-pentyl-2-cyclopenten-1-one; 3-methyl-4-cyclopentadecenone; 3-methyl-5-cyclopentadecenone; 3-methylcyclopentadecanone; 4-(1-ethoxyvinyl)-3,3,5,5-tetramethylcyclohexanone; 4-tert-pentylcyclohexanone; 5-cyclohexadecen-1-one; 6,7-dihydro-1,1,2,3,3-pentamethyl-4(5H)-indanone; 8-cyclohexadecen-1-one; 9-cycloheptadecen-1-one; cyclopentadecanone; cyclohexadecanone;

cycloaliphatic aldehydes such as for example: 2,4-dimethyl-3-cyclohexene carbaldehyde; 2-methyl-4-(2,2,6-trimethyl-cyclohexen-1-yl)-2-butenal; 4-(4-hydroxy-4-methylpentyl)-3-cyclohexene carbaldehyde; 4-(4-methyl-3-penten-1-yl)-3-cyclo-hexene carbaldehyde;

cycloaliphatic ketones, such as for example: 1-(3,3-dimethyl-cyclohexyl)-4-penten-1-one; 2,2-dimethyl-1-(2,4-dimethyl-3-cyclohexene-1-yl)-1-propanone; 1-(5,5-dimethyl-1-cyclohexen-1-yl)-4-penten-1-one; 2,3,8,8-tetramethyl-1,2,3,4,5,6,7,8-octahydro-2-naphthalenyl methyl ketone; methyl-2,6,10-trimethyl-2,5,9-cyclododecatrienyl ketone; tert-butyl-(2,4-dimethyl-3-cyclohexen-1-yl)ketone;

esters of cyclic alcohols, such as for example: 2-tert-butylcyclohexyl acetate; 4-tert-butylcyclohexyl acetate; 2-tert-pentylcyclohexyl acetate; 4-tert-pentylcyclohexyl acetate; 3,3,5-trim ethylcyclohexyl acetate; decahydro-2-naphthyl acetate; 2-cyclopentylcyclopentyl crotonate; 3-pentyltetrahydro-2H-pyran-4-yl acetate; decahydro-2,5,5,8a-tetram ethyl-2-naphthyl acetate; 4,7-methano-3a,4,5,6,7,7a-hexahydro-5- or 6-indenyl acetate; 4,7-methano-3a,4,5,6,7,7a-hexahydro-5- or 6-indenyl propionate; 4,7-methano-3a,4,5, 6,7,7a-hexahydro-5- or 6-indenyl isobutyrate; 4,7-methanooctahydro-5- or 6-indenyl acetate;

esters of cycloaliphatic alcohols, such as for example: 1-cyclohexylethyl crotonate;

esters of cycloaliphatic carboxylic acids, such as for example: allyl-3-cyclohexyl propionate; allylcyclohexyl oxyacetate; cis- and trans-methyl dihydrojasmonate; cis- and trans-methyl jasmonate; methyl-2-hexyl-3-oxocyclopentane carboxylate; ethyl-2-ethyl-6, 6-dimethyl-2-cyclohexene carboxylate; ethyl-2,3,6,6-tetramethyl-2-cyclohexene carboxylate; ethyl-2-methyl-1,3-dioxolane 2-acetate;

araliphatic alcohols, such as for example: benzyl alcohol; 1-phenylethyl alcohol; 2-phenylethyl alcohol; 3-phenylpropanol; 2-phenylpropanol; 2-phenoxyethanol; 2,2-dimethyl-3-phenylpropanol; 2,2-dimethyl-3-(3-methylphenyl)propanol; 1,1-dimethyl-2-phenylethyl alcohol; 1,1-dimethyl-3-phenylpropanol; 1-ethyl-1-methyl-3-phenylpropanol; 2-methyl-5-phenylpentanol; 3-methyl-5-phenylpentanol; 3-phenyl-2-propen-1-ol; 4-methoxybenzyl alcohol; 1-(4-isopropylphenyl)ethanol;

esters of araliphatic alcohols and aliphatic carboxylic acids, such as for example: benzyl acetate; benzyl propionate; benzyl isobutyrate; benzyl isovalerate; 2-phenylethyl acetate; 2-phenylethyl propionate; 2-phenylethyl isobutyrate; 2-phenylethyl isovalerate; 1-phenylethyl acetate; alpha-trichloromethylbenzyl acetate; alpha,alpha-dimethylphenylethyl acetate; alpha,alpha-dimethylphenyl-ethyl butyrate; cinnamyl acetate; 2-phenoxyethyl isobutyrate; 4-methoxybenzyl acetate;

araliphatic ethers, such as for example: 2-phenyl ethyl methyl ether; 2-phenyl ethyl isoamyl ether; 2-phenyl ethyl 1-ethoxyethyl ether; phenylacetaldehyde dimethylacetal; phenylacetaldehyde diethylacetal; hydratropaldehyde dimethylacetal; phenylacetaldehyde glycerol acetal; 2,4,6-trimethyl-4-phenyl-1,3-dioxane; 4,4a, 5,9b-tetrahydroindeno[1,2-d]-m-dioxin; 4,4a,5,9b-tetrahydro-2,4-dimethylindeno[1,2-d]-m-dioxin;

aromatic and araliphatic aldehydes, such as for example: benzaldehyde; phenylacetaldehyde; 3-phenylpropanal; hydratropaldehyde; 4-methylbenz-aldehyde; 4-methylphenylacetaldehyde; 3-(4-ethylphenyl)-2,2-dimethylpropanal; 2-methyl-3-(4-isopropylphenyl)propanal; 2-methyl-3-(4-tert-butylphenyl)propanal; 2-methyl-3-(4-isobutylphenyl)propanal; 3-(4-tert-butylphenyl)propanal; cinnamaldehyde; alpha-butylcinnamaldehyde; alpha-amylcinnamaldehyde; alpha-hexylcinnamaldehyde; 3-methyl-5-phenylpentanal; 4-methoxybenzaldehyde; 4-hydroxy-3-methoxybenz-aldehyde; 4-hydroxy-3-ethoxybenzaldehyde; 3,4-methylenedioxybenzaldehyde; 3,4-dimethoxybenzaldehyde; 2-methyl-3-(4-methoxyphenyl)propanal; 2-methyl-3-(4-methylenedioxyphenyl)propanal;

aromatic and araliphatic ketones, such as for example: acetophenone; 4-methyl-acetophenone; 4-methoxyacetophenone; 4-tert-butyl-2,6-dimethylacetophenone; 4-phenyl-2-butanone; 4-(4-hydroxyphenyl)-2-butanone; 1-(2-naphthalenyl)ethanone; 2-benzofuranylethanone; (3-methyl-2-benzofuranyl)ethanone; benzophenone; 1,1,2,3,3,6-hexamethyl-5-indanyl methyl ketone; 6-tert-butyl-1,1-dimethyl-4-indanyl methyl ketone; 1-[2,3-dihydro-1,1,2,6-tetramethyl-3-(1-methylethyl)-1H-5-indenyl]ethanone; 5',6',7',8'-tetrahydro-3',5',5',6',8',8'-hexamethyl-2-acetonaphthone;

aromatic and araliphatic carboxylic acids and the esters thereof, such as for example: benzoic acid; phenylacetic acid; methyl benzoate; ethyl benzoate; hexyl benzoate; benzyl benzoate; methylphenyl acetate; ethylphenyl acetate; geranylphenyl acetate; phenylethylphenyl acetate; methyl cinnamate; ethyl cinnamate; benzyl cinnamate; phenylethyl cinnamate; cinnamyl cinnamate; allyl phenoxy acetate; methyl salicylate; isoamyl salicylate; hexyl salicylate; cyclohexyl salicylate; cis-3-hexenyl salicylate; benzyl salicylate; phenylethyl salicylate; methyl-2,4-dihydroxy-3,6-dimethylbenzoate; ethyl-3-phenyl glycidate; ethyl-3-methyl-3-phenyl glycidate;

nitrogenous aromatic compounds, such as for example: 2,4,6-trinitro-1,3-dimethyl-5-tert-butylbenzene; 3,5-dinitro-2,6-dimethyl-4-tert-butyl aceto-phenone; cinnamonitrile; 3-methyl-5-phenyl-2-pentenoic acid nitrile; 3-methyl-5-phenylpentanoic acid nitrile; methyl anthranilate; methyl-N-methyl anthranilate; Schiff bases of methyl anthranilate with 7-hydroxy-3,7-dimethyloctanal, 2-methyl-3-(4-tert-butylphenyl)propanal or 2,4-dimethyl-3-cyclohexene carbaldehyde 6-isopropyl quinoline; 6-isobutyl quinoline; 6-sec-butyl quinoline; 2-(3-phenylpropyl)pyridine; indole; skatole; 2-methoxy-3-isopropylpyrazine; 2-isobutyl-3-methoxypyrazine;

phenols, phenyl ethers and phenyl esters, such as for example: estragole; anethole; eugenol; eugenyl methyl ether; isoeugenol; isoeugenyl methyl ether; thymol; carvacrol; diphenyl ether; beta-naphthyl methyl ether; beta-naphthyl ethyl ether; beta-naphthyl isobutyl ether; 1,4-dimethoxybenzene; eugenyl acetate; 2-methoxy-4-methylphenol; 2-ethoxy-5-(1-propenyl)phenol; p-cresyl phenyl acetate;

heterocyclic compounds, such as for example: 2,5-dimethyl-4-hydroxy-2H-furan-3-one; 2-ethyl-4-hydroxy-5-methyl-2H-furan-3-one; 3-hydroxy-2-methyl-4H-pyran-4-one; 2-ethyl-3-hydroxy-4H-pyran-4-one;

lactones, such as for example: 1,4-octanolide; 3-methyl-1,4-octanolide; 1,4-nonanolide; 1,4-decanolide; 8-decen-1,4-olide; 1,4-undecanolide; 1,4-dodecan-olide; 1,5-decanolide; 1,5-dodecanolide; 4-methyl-1,4-decanolide; 1,15-penta-decanolide; cis- and trans-11-pentadecen-1,15-olide; cis- and trans-12-pentadecen-1,15-olide; 1,16-hexadecanolide; 9-hexadecen-1,16-olide; 10-oxa-1,16-hexadecanolide; 11-oxa-1,16-hexadecanolide; 12-oxa-1,16-hexadecanolide; ethylene 1,12-dodecanedioate; ethylene 1,13-tridecanedioate; coumarin; 2,3-dihydrocoumarin; octahydrocoumarin;

and mixtures of the above substances.

In such fragrance compositions, the compounds according to the present invention exhibit a positive influence on the overall fragrance chord by distinctly enhancing the woody and sandalwood-like nature of the final composition with fresh notes and simultaneously offering good tenacity, fixation and substantivity. The presently described compounds according to the invention thus can be used as efficient and highly stable fragrance compounds.

It goes without saying that it is preferred, albeit not absolutely essential, for a fragrance composition according to the invention to comprise an amount of a compound according to the invention, preferably according to general formula (II), which is olfactorily perceptible as a woody sandalwood odour note. However, based on the low ODT value, only low amounts of the inventive compounds are required in order to achieve the desired odour characteristics.

Moreover, due to the high chemical stability towards acidic conditions it is possible to incorporate the inventive compounds as fragrance components into a multiplicity of fragrance compositions irrespective of the pH-value of the overall formulation.

In fragrance compositions, the amount of the compound according to the invention used is preferably ranging from 0.0001 to 90% by weight, preferably 0.01 to 70% by weight and particularly preferably 0.1 to 50% by weight, relative to the total amount of the fragrance composition.

Fragrance compounds according to the invention and fragrance compositions which comprise or contain the at least one compound according to the invention may be used for perfuming applications in liquid form, undiluted or diluted with a solvent. Solvents suitable for this purpose are for example ethanol, isopropanol, diethylene glycol monoethyl ether, glycerol, propylene glycol, 1,2-butylene glycol, dipropylene glycol, diethyl phthalate, triethyl citrate, isopropyl myristate, triacetin, vegetable oils, etc.

Moreover, the fragrance compounds according to the invention or fragrance compositions which comprise or contain the compounds according to the invention may be adsorbed on a carrier which ensures both a fine distribution of the fragrance substances in the final product and controlled release upon use. Such carriers may be porous inorganic materials such as sodium sulphate, silica gels, zeolites, gypsums, clays, clay granules, aerated concrete etc., or organic materials such as woods, cellulose-based substances, sugars, dextrins (for example maltodextrin), or plastics such as PVC, polyvinyl acetates or polyurethanes.

Fragrance compounds according to the invention and fragrance compositions which comprise or contain the compound(s) according to the invention indicated by formulas (I) to (V) may also be microencapsulated, spray-dried, be provided as inclusion complexes or as extrusion products (i.e. products according to the invention).

Optionally, the properties of the fragrance compounds or compositions modified in such a way may be further optimised with regard to a more targeted fragrance release by "coating" with suitable materials, for which purpose waxy plastics, such as for example polyvinyl alcohol, are preferably used. The resultant products are in turn products according to the invention.

The fragrance compounds according to the invention or fragrance compositions according to the invention may be encapsulated, for example, by coacervation methods with the assistance of capsule materials made, for example, from polyurethane-type substances or soft gelatine.

Spray-dried fragrance formulations based on fragrance compounds according to the invention and fragrance compositions which comprise or contain the compound(s) according to the invention may be produced for example by spray-drying an emulsion or dispersion comprising or containing the fragrance compound or composition, wherein modified starches, proteins, dextrin and vegetable gums may be used as carriers. Inclusion complexes may be produced for example by introducing dispersions of the fragrance compound or composition and cyclodextrins or urea derivatives into a suitable solvent, for example water.

Extrusion products may be produced by melting the fragrance compound or compositions with a suitable waxy substance and extruding with subsequent solidification, optionally in a suitable solvent, for example isopropanol.

Due to the special sandalwood fragrance with green and fruity notes of the compounds described herein in combination with their outstanding secondary properties, such as the low ODT values and high chemical stability, which are superior to the sandalwood fragrance substances known from the prior art, a compound according to general formula (I), and preferably a compound according to general formula (II), or a fragrance composition comprising or containing a compound according to the invention enables balanced sandalwood notes to be obtained in the resulting perfumed formulations/products even at low rate of addition of the inventive (fragrance) compound while simultaneously guaranteeing an enhanced fixation (tenacity) and improved chemical stability in acid environment/formulations.

In another aspect, the present invention thus relates to the use of a compound according to general formula (I) or a fragrance composition comprising or containing a compound according to the invention as an efficient odorant or fragrance compound. The comments made above apply correspondingly to preferred compounds and mixtures.

On the basis of their remarkable first and second olfactory properties such as tenacity, low odour threshold value and high chemical stability, the present invention accordingly also relates to the use of a compound according to general formula (I) or a fragrance composition comprising or containing at least one compound according to the invention for improving the fixation of a fragrance compound while making simultaneous use of the compound or of the composition comprising or containing the at least one compound according to the invention as a fragrance substance and for preparing perfumed products. With regard to the preferred choice of compounds and mixtures according to the invention, the comments made above of course apply correspondingly.

Therefore, the present invention relates to the use of said compounds and compositions for improving the fixation of a fragrance compound or for the preparation of a perfumed product.

The compounds or compositions which comprise or contain a compound according to the invention may be incorporated into products which are perfumed or are intended to be perfumed, in particular formulations serving for personal hygiene such as perfume oils, perfume bases, formulations for personal hygiene, cleaning agents or air fresheners.

Thus, in another aspect, the present invention also refers to perfumed products comprising or containing a compound according to the invention and formula (I) or a fragrance composition comprising or containing at least one compound according to the invention.

In accordance with a preferred variant, the perfumed products according to the invention comprising or containing the compound or a fragrance composition which comprises or contains a compound according to the invention are produced by incorporating the compound or composition which comprises or contains a compound according to the invention, in pure form without a solvent, as a solution or in the form of a mixture with a solid or liquid carrier and optionally other auxiliaries and/or stabilisers to form a base preparation serving for personal hygiene such as cleaning agents and the like.

The present invention therefore also provides a perfumed product comprising or containing a compound of general formula (I) (or formula (II), (III) and/or (IV) and/or (V)) or a fragrance composition which comprises or contains at least a compound according to the invention in an effective amount in combination with a carrier or substrate.

A sensory effective amount means that already a proportion of the substances of formula (I), formula (II), formula (III) and/or formula (IV) as well as the monofunctionalized compounds of general formula (V), in particular compounds according to general formula (I), in the mixture is sufficient to emanate a pleasant perceptible fragrance impression, especially a sandalwood-like woody odour impression. This perceivable olfactory impression is generally achieved when at least 0.001 wt. % of the compounds of formula (I), formula (II), formula (III) and/or formula (IV) and/or formula (V) are present in the final preparation/formulation.

The compounds of formula (I) described herein have, in addition to their intensive sensory properties, additional positive secondary properties, such as a high stability under certain application conditions. This stability, especially in acidic media qualifies the inventive compounds for use and processing in a wide range of applications.

Perfumed products according to the invention are for example perfume extracts, eaux de parfum, eaux de toilette, shaving lotions, eaux de cologne, pre-shave products, splash colognes and perfumed tissue wipes, including for perfuming acidic, alkaline and neutral cleaning agents such as for example floor cleaners, window cleaners, dishwashing detergents, bath and sanitary cleaners, scouring creams, solid and liquid toilet cleaners, pulverulent and foam carpet cleaners, textile fresheners, ironing aids, liquid detergents, pulverulent detergents, laundry pre-treatment agents such as bleaches, soaking agents and stain removers, laundry rinse conditioners, laundry soaps, laundry tablets, disinfectants, surface disinfectants as well as air fresheners in liquid or gel form or those applied to a solid carrier, aerosol sprays, waxes and polishes such as furniture polishes, floor waxes and shoe polishes as well as body care products such as for example solid and liquid soaps, shower gels, shampoos, shaving soaps, shaving foams, bath oils, cosmetic emulsions of the oil-in-water, water-in-oil and water-in-oil-in-water type such as for example skin creams and lotions, face creams and lotions, sunscreen creams and lotions, after-sun creams and lotions, hand creams and lotions, foot creams and lotions, depilatory creams and lotions, after-shave creams and lotions, tanning creams and lotions, hair care products such as for example hair sprays, hair gels, strengthening hair lotions, hair rinses, permanent and semi-permanent hair dyes, hair styling agents such as cold waving and hair straightening agents, hair tonics, hair creams and lotions, deodorants and antiperspirants such as for example underarm sprays, roll-ons, deodorant sticks, deodorant creams, decorative cosmetic products such as for example eyeshadow, nail varnish, make-up products, lipstick, mascara, as well as candles, lamp oils, incense sticks, insecticides, repellents and fuels or oral and/or dental care products such as toothpastes, tooth gels, tooth powders, mouthwashes, chewing gum and other oral care products.

The products according to the invention may also be semi-finished products comprising a compound of general formula (I) or a fragrance composition which contains or comprises at least a compound according to the invention in an effective amount.

The percentages at which the compound of general formula (I) or a fragrance composition which contains or comprises at least a compound according to the invention is used may vary within wide limits, ranging from a few parts per thousand in mass market products such as cleaning agents up to a few percent in alcoholic extracts for fine perfumery. However, even small amounts of the novel compounds or a fragrance composition which comprises or contains at least a compound according to the invention efficiently provide a rich sandalwood or woody note to the perfumed formulation/product. Preferably, the compound of general formula (I) or a fragrance composition which comprises or contains at least a compound according to the invention is used in an amount of 0.0001 to 90% by weight, preferably 0.01 to 70% by weight and particularly preferably 0.1 to 50% by weight, based on the total weight of the final (product) formulation.

However, due to the enhanced chemical stability of the inventive compounds towards acidic conditions, the use of the inventive compounds and compositions for the preparation of acid-based formulations and products is preferred, such as acidic perfume oils, perfume bases, formulations for personal hygiene such as shampoos, shower gels, face creams and lotions, sunscreen creams and lotions, cleaning agents or air fresheners in liquid or gel form or those applied to a solid carrier (i.e. formulations and products exhibiting an acidic pH-value and thus a pH of <7).

Therefore, finally the present invention relates to perfumed products, wherein the perfumed product is preferably a perfume oil, perfume base, formulation for personal hygiene, cleaning agent or air freshener.

Since such products often contain a large number of chemical ingredients, it is important that the fragrance compounds or the corresponding fragrance compositions also have a low chemical reactivity in order to counteract undesired interactions or decomposition of the ingredients and/or the fragrance material. The use of the compounds according to the invention is therefore particularly advantageous as these have a low reactivity and high stability especially in acidic media, so that neither the compounds according to the invention nor the ingredients of the perfumed products are adversely affected. In this context, the low concentration of fragrance compounds, which is necessary to achieve the desired fragrance effect, should be particularly emphasized, which additionally avoids any adverse change in the properties of the perfumed products or their further ingredients.

In this context, it was surprisingly found that the modification of the molecule towards a rearrangement of the functionalization within the butyl chain C1 to C4 results in an increased chemical stability under acid conditions and increased temperatures and simultaneously causes a more green and fruity sandalwood-based odour resulting in a fresher and more vibrant, and thus more balanced, scent. In addition, it was possible to achieve excellent ODT values. In conclusion, these compounds are very well suited for the formulation of various acidic products, which can be used at elevated temperatures without losing their olfactory quality and intensity.

Surprisingly, the compounds according to the present invention exhibit a balanced and natural sandalwood-like odour profile with woody, floral as well as green and fruity notes. Furthermore, the compounds according to the invention which are suitable odorants or fragrance compounds have a high chemical and physical stability, tenacity a well as a remarkably low odour threshold. A further advantage of the compounds according to the invention is thus their high odour intensity at comparatively low concentrations.

Due to their high chemical stability, the inventive compounds show extremely low tendency to react with other ingredients of product formulations or other fragrance materials, so that the olfactory and/or chemical properties of the individual components are not adversely affected. Such changes in the odour profiles often result, for example, from the degradation of fragrance materials due to their insufficient stability or from the formation of by-products due to chemical interactions of the fragrance materials and other ingredients of the formulation/product with each other.

EXAMPLES

The following compounds were prepared according to the methods indicated below and the following general scheme starting from campholene aldehyde (compound 1):

Reaction scheme 1: General synthesis scheme

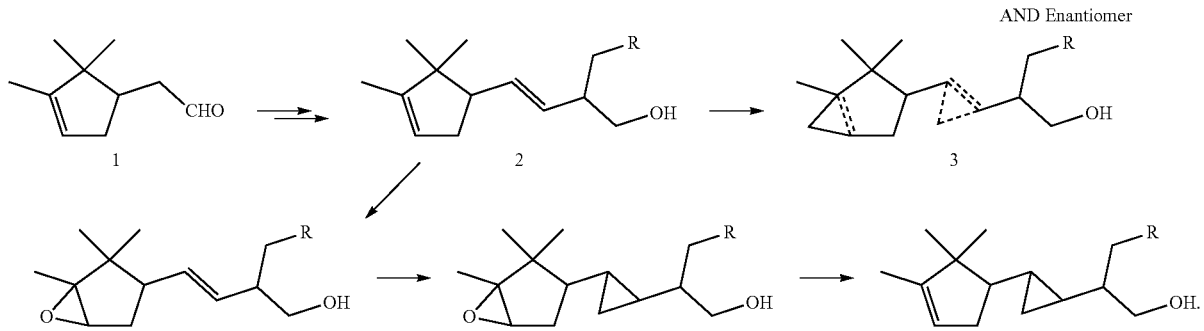

Based on commercially available campholene aldehyde (compound 1) the corresponding 2,2,3-trimethylcyclopent-3-enyl derivatives (compound 2, R=H, Me) were synthesized according to the process disclosed in DE 3441902 C1. The synthesis disclosed therein was adapted accordingly to isolate the compound having a C=C-double bond between the C-atoms C3 and C4 as indicated in general formula (I) as initially also compounds having a C=C-double bond between the C-atoms C2 and C3 are formed. In a second step, the final products according to general formula (I) (compound 3, R=H, Me) were obtained based on the Simmons-Smith cyclopropanation and the methods described in WO 2017/024126 A1 and EP 0 801 049 B1.

The structure determination by means of spectroscopy, was carried out by known techniques.

As indicated above, all compounds disclosed herein as well as all formulas should encompass both the pure stereoisomers, in particular enantiomers, and mixtures of the stereoisomers, in particular mixtures of the enantiomers. Also, all intermediates obtained from the process can occur in different isomeric forms, and, thus, should encompass both the pure stereoisomers and mixtures of the stereoisomers.

Example 1: Preparation of Compound 3a

Step 1: Preparation of 2-ethyl-4-(2,2,3-trimethylcyclopent-3-en-1-yl)but-3-en-1-ol (Compound 2a)

Compound 2a was prepared according to the method described in DE 3441902 C1.
Experimental Data of 2-ethyl-4-(2,2,3-trimethylcyclopent-3-en-1-yl)but-3-en-1-ol (Compound 2a):
$^1$H NMR (400 MHz, CDCl$_3$) δ 5.61 (dd, J=15.4, 8.5 Hz, 2H), 5.26-5.22 (m, 2H), 5.16 (dtd, J=15.3, 8.8, 1.0 Hz, 2H), 3.59-3.53 (m, 2H), 3.42-3.34 (m, 2H), 2.45-2.37 (m, 2H), 2.31-2.22 (m, 2H), 2.18-2.05 (m, 4H), 1.63-1.60 (m, 6H), 1.51-1.40 (m, 2H), 1.31-1.18 (m, 2H), 0.97 (s, 6H), 0.96-0.85 (m, 6H), 0.77 (s, 6H).
$^{13}$C NMR (101 MHz, CDCl$_3$) δ 148.02, 148.02, 135.24, 134.75, 131.78, 131.56, 121.46, 121.46, 65.88, 65.80, 54.34, 54.20, 48.09, 48.05, 47.83, 47.81, 35.60, 35.30, 25.46, 25.37, 24.08, 24.05, 20.64, 20.50, 12.72, 12.72, 11.81, 11.66.
GC-MS: 208, 193, 177, 161, 135, 121, 107, 93, 79, 55, 41, 28.

Step 2: Preparation of 2-[2-(1,2,2-trimethyl-3-bicyclo[3.1.0]hexanyl)cyclopropyl]butan-1-ol (Compound 3a, corresponding to general formula (II))

Compound 3a was prepared according to the method described in WO 2017/024126 A1.

Experimental Data of 2-[2-(1,2,2-trimethyl-3-bicyclo[3.1.0]hexanyl)cyclopropyl]butan-1-ol (Compound 3a):
$^1$H NMR (400 MHz, CDCl$_3$) δ 3.67-3.56 (m, 4H), 1.78-1.62 (m, 2H), 1.65-1.46 (m, 4H), 1.50-1.39 (m, 2H), 1.03 (s, 3H), 1.03 (s, 3H), 0.98-0.93 (m, 2H), 0.95 (s, 6H), 0.94 (t, J=7.8 Hz, 3H), 0.94 (s, 3H), 0.92 (t, J=7.8 Hz, 3H), 0.92 (s, 3H), 0.80-0.65 (m, 2H), 0.61 (dt, J=10.9, 7.9 Hz, 1H), 0.45-0.40 (m, 1H), 0.40-0.30 (m, 6H), 0.30-0.22 (m, 2H), 0.20-0.11 (m, 2H), 0.11 (dd, J=7.8, 4.9 Hz, 2H).
$^{13}$C NMR (101 MHz, CDCl$_3$) δ 66.09, 65.46, 49.97, 49.11, 47.18, 47.03, 41.95, 41.72, 32.99, 31.68, 31.52, 31.42, 24.34, 24.27, 23.70, 23.25, 22.32, 22.02, 20.72, 20.67, 19.88, 18.90, 17.36, 17.28, 17.11, 16.66, 13.82, 13.78, 11.49, 11.33, 9.87, 8.79.
Odour description: sandal, cedarwood, floral, fruity, creamy, soft, green.

Additional Step: Isolation of 2-ethyl-4-(1,2,2-trimethyl-3-bicyclo[3.1.0]hexanyl)but-3-en-1-ol (Side Product, Corresponding to General Formula (III)):

The side product 2-ethyl-4-(1,2,2-trimethyl-3-bicyclo[3.1.0]hexanyl)but-3-en-1-ol, a monocyclopropanated alcohol, was isolated via conventional methods such as column chromatography.

Experimental Data of 2-ethyl-4-(1,2,2-trimethyl-3-bicyclo[3.1.0]hexanyl)but-3-en-1-ol (Side Product):
$^1$H NMR (400 MHz, CDCl$_3$) δ 5.40 (dd, J=15.2, 7.3 Hz, 1H), 5.09-5.01 (m, 1H), 3.56-3.50 (m, 1H), 3.39-3.31 (m, 1H), 2.08 (ddt, J=14.6, 5.8, 3.6 Hz, 1H), 1.86-1.76 (m, 1H), 1.67 (tt, J=12.0, 5.7 Hz, 2H), 1.47-1.39 (m, 1H), 1.27-1.16 (m, 1H), 1.04 (s, 3H), 0.88 (t, J=3.7 Hz, 6H), 0.77 (s, 3H), 0.45 (q, J=3.5, 2.7 Hz, 1H), 0.07-0.04 (m, 1H).
$^{13}$C NMR (101 MHz, CDCl$_3$) δ 134.22, 131.42, 65.80, 47.95, 47.86, 42.47, 31.87, 30.95, 24.05, 22.70, 22.62, 20.55, 17.45, 13.97, 11.67.
Odour description: sandalwood, woody, green, fruity.

Example 2: Preparation of Compound 3b

Step 1: Preparation of 2-methyl-4-(2,2,3-trimethylcyclopent-3-en-1-yl)but-3-en-1-ol (Compound 2b)

Compound 2b was prepared according to the method described in DE 3441902 C1.
Experimental Data of 2-methyl-4-(2,2,3-trimethylcyclopent-3-en-1-yl)but-3-en-1-ol (Compound 2b):
$^1$H NMR (600 MHz, CDCl$_3$) δ 5.59 (dddd, J=15.6, 8.5, 7.3, 1.0 Hz, 2H), 5.28 (ddd, J=15.3, 7.9, 1.0 Hz, 2H), 5.25-5.23 (m, 2H), 3.52-3.46 (m, 2H), 3.41-3.36 (m, 2H), 2.41-2.33 (m, 4H), 2.30-2.22 (m, 2H), 2.14-2.06 (m, 2H), 1.62-1.60 (m, 6H), 1.01 (d, J=6.8 Hz, 3H), 1.01 (d, J=6.8 Hz, 3H), 0.96 (s, 3H), 0.96 (s, 3H), 0.76 (s, 3H), 0.75 (s, 3H).

$^{13}$C NMR (151 MHz, CDCl$_3$) δ 148.09, 148.03, 133.19, 133.12, 132.97, 132.92, 121.47, 121.44, 67.36, 67.33, 54.16, 54.05, 47.93, 47.89, 39.94, 39.89, 35.45, 35.42, 25.44, 25.35, 20.56, 20.45, 16.88, 16.70, 12.70, 12.72.

GC-MS: 194, 179, 163, 151, 135, 121, 107, 93, 79, 69, 55, 41, 29.

Step 2: Preparation of 2-[2-(1,2,2-trimethyl-3-bicyclo[3.1.0]hexanyl)cyclo-propyl]propan-1-ol (Compound 3b, Corresponding to General Formula (II))

Compound 3b was prepared according to the method described in WO 2017/024126 A1 or EP 0 801 049 B1. Experimental Data of 2-[2-(1,2,2-trimethyl-3-bicyclo[3.1.0] hexanyl)cyclopropyl]propan-1-ol (Compound 3b):

$^1$H NMR (400 MHz, CDCl$_3$) δ 3.65-3.54 (m, 2H), 3.55-3.45 (m, 2H), 1.65-1.49 (m, 4H), 1.07 (d, J=6.7 Hz, 3H), 1.03 (s, 3H), 1.03 (s, 3H), 0.97 (s, 3H), 0.96-0.95 (m, 3H), 0.97-0.94 (m, 7H), 0.94 (s, 3H), 0.91 (s, 3H), 0.51-0.43 (m, 2H), 0.42-0.31 (m, 4H), 0.38-0.29 (m, 2H), 0.29-0.04 (m, 4H), 0.02--0.05 (m, 2H).

$^{13}$C NMR (101 MHz, CDCl$_3$) δ 68.72, 68.70, 49.80, 49.71, 41.78, 41.72, 40.97, 40.64, 32.96, 32.06, 31.82, 31.66, 31.61, 23.66, 23.31, 22.28, 22.03, 21.28, 20.69, 20.23, 17.34, 17.30, 17.15, 16.70, 16.45, 16.18, 13.86, 13.74, 10.19, 8.97.

GC-MS: 222, 207, 181, 154, 121, 107, 93, 81, 67, 55, 41, 29.

Odour description: green, floral, fruity, woody, creamy, sandal.

Example 3: Preparation of 2-[2-(2,2,3-trimethylcyclopentyl)cyclopropyl]propan-1-ol (Corresponding to General Formula (V))

Step 1: Synthesis of 2-(2,2,3-trimethylcyclopentyl)acetaldehyde (According to Literature: Helvetica Chimica Acta, 2006, 89 (11), 2638-2653)

A first step of the preparation was the hydrogenation of 2-(2,2,3-trimethylcyclopent-3-en-1-yl)acetaldehyde (600.0 g, 253.3 mmol) in an autoclave using Pd/C (5%) catalyst (30 g) under 30 bar at 80° C. Following the complete consumption of hydrogen, the reaction mixture was filtered and evaporated (60° C./500 to 10 mbar) to obtain 555 g of the crude product. Subsequent Kugelrohr distillation (85° C., 0.1 mbar) resulted in 498 g, 82% of said intermediate product.

Experimental data of 2-(2,2,3-trimethylcyclopentyl)acetaldehyde:

$^1$H NMR (600 MHz, C$_6$D$_6$) δ 9.40 (dd, J=2.4, 1.8 Hz, 1H), 2.02-1.96 (m, 1H), 1.76-1.71 (m, 2H), 1.65-1.61 (m, 1H), 1.61-1.56 (m, 1H), 1.32-1.28 (m, 1H), 1.07-1.01 (m, 1H), 0.97-0.92 (m, 1H), 0.74 (d, J=6.8 Hz, 3H), 0.67 (s, 3H), 0.29 (s, 3H).

$^{13}$C NMR (101 MHz, C$_6$D$_6$) δ 201.03, 45.41, 44.74, 44.71, 41.27, 30.36, 28.27, 25.36, 14.57, 14.01.

GC-MS: 139, 97, 69, 41.

Odour description: fruity, sweet, anise.

Step 2: Synthesis of 2-methyl-4-(2,2,3-trimethylcyclopentyl)but-2-enal

To a solution of 2-(2,2,3-trimethylcyclopentyl)acetaldehyde (168.11 g, 1.09 mol) in methanol (300 ml), commercially available 32% NaOH (15.12 mL, 163.47 mmol) was slowly added at a temperature ranging from 15 to 20° C. (exotherm), followed by the addition of propanal (156.5 mL) (exotherm). Thereafter, the addition reaction was maintained at room temperature (for approximately 16 h). Subsequently, the reaction was quenched with water (400 ml), the pH neutralized with sulphuric acid, methanol was removed by distillation under reduced pressure. The as-obtained crude compound was extracted using MTBE (300 mL×3) and the combined organic layers were washed with a saturated solution of ammonium chloride (300 mL) and sodium chloride (300 mL). The combined organic layers were further washed with water until the aqueous phase showed a neutral pH-value, followed by drying under Na$_2$SO$_4$, filtration and the removal of MTBE by using a rotary evaporator to obtain 261.73 g of the crude product. Said crude product was further purified by distillation (R$_T$=140 to 210° C., H$_T$=90 to 122° C., vacuum=5 mbar) giving 83.8 g of the title compound.

Experimental Data of 2-methyl-4-(2,2,3-trimethylcyclopentyl)but-2-enal:

$^1$H NMR (400 MHz, CDCl$_3$) δ 9.39 (s, 1H), 6.53 (tq, J=7.5, 1.4 Hz, 1H), 2.49-2.40 (m, 1H), 2.13 (ddd, J=14.4, 10.5, 7.6 Hz, 1H), 1.88-1.72 (m, 2H), 1.76 (d, J=1.3 Hz, 3H), 1.62-1.48 (m, 2H), 1.29-1.17 (m, 2H), 0.93 (s, 3H), 0.86 (d, J=6.8 Hz, 3H), 0.59 (s, 3H).

$^{13}$C NMR (101 MHz, CDCl$_3$) δ 195.46, 155.24, 139.17, 50.34, 44.91, 42.59, 30.31, 29.94, 28.20, 25.67, 14.49, 13.91, 9.29.

GC-MS: 194, 179, 161, 137, 123, 109, 95, 84, 69, 55, 41, 29.

Step 3: Synthesis of 2-methyl-4-(2,2,3-trimethylcyclopentyl)but-3-en-1-ol (Synthesis According to Literature: DE 3441902)

Following the procedure disclosed in DE 3441902, 2-methyl-4-(2,2,3-trimethylcyclopentyl)but-2-enal (42.2 g, 161.6 mmol) in methanol (80 ml) was heated to 60° C., and a pre-dissolved solution of NaBH$_4$ (2.0 g, 51.7 mmol) in 15 ml 1%-NaOH was slowly added at 60° C. for 1 h followed by another 1 h at room temperature. Subsequently, the reaction mixture was evaporated (60° C./350 to 150 mbar) and the methanol removed, followed by extraction using MTBE (100 mL×3). The organic layers were washed with saturated NaCl solution (100 mL), dried under Na$_2$SO$_4$ and filtered and the MTBE removed using a rotary evaporator (40° C./500 to 30 mbar), followed by Kugelrohr distillation (120° C., 0.8 mbar) resulting in 30 g of the product as a mixture (1:5) of 2-methyl-4-(2,2,3-trimethylcyclopentyl) but-3-en-1-ol and 2-methyl-4-(2,2,3-trimethylcyclopentyl) but-2-en-1-ol. Subsequent Spaltroh-destillation (R$_T$=70 to 85° C., H$_T$=75 to 95, vacuum=1 mbar) gave 8% of title compound.

Experimental Data of 2-methyl-4-(2,2,3-trimethylcyclopentyl)but-3-en-1-ol:

CG-MS: 196, 181, 163, 111, 95, 81, 69, 55, 41, 29.

Step 4: Synthesis of 2-[2-(2,2,3-trimethylcyclopentyl)cyclopropyl]propan-1-ol (Synthesis According to Literature: WO 2017/024126)

Synthesis based on the literature starting from 2-methyl-4-(2,2,3-trimethylcyclopentyl)but-3-en-1-ol (2.85 g, 14.5 mmol gave after purification by Kugelrohr distillation (122 to 130° C., 22 mbar) 1.62 g of the title compound.

Experimental Data of 2-[2-(2,2,3-trimethylcyclopentyl)cyclopropyl]propan-1-ol:

$^1$H NMR (600 MHz, C$_6$D$_6$) δ 3.45 (dd, J=10.3, 5.3 Hz, 1H), 3.30 (t, J=10.3 Hz, 1H), 1.74-1.63 (m, 2H), 1.48-1.31 (m, 2H), 1.21-1.13 (m, 1H), 1.03 (d, J=6.8 Hz, 3H), 0.97 (s, 3H), 0.85 (d, J=6.8 Hz, 3H), 0.80-0.73 (m, 1H), 0.69 (s, 3H), 0.61 (dt, J=10.9, 8.8 Hz, 1H), 0.31 (ddt, J=9.4, 8.1, 4.8 Hz, 1H), 0.25 (tt, J=9.4, 4.7 Hz, 1H), 0.16 (dt, J=8.6, 4.9 Hz, 1H), 0.04 (dt, J=8.1, 4.9 Hz, 1H).

$^{13}$C NMR (151 MHz, C$_6$D$_6$) δ 68.26, 56.21, 45.76, 43.14, 41.56, 30.05, 28.24, 26.45, 21.45, 17.44, 17.21, 15.27, 14.10, 9.16.

GC-MS: 210, 195, 177, 149, 137, 123, 109, 95, 82, 69, 55, 41, 29.

Odour description: cedarwood, sandalwood, creamy.

Example 4: Comparison of the Chemical Stability

Example 4 shows a comparison of the chemical stability of the inventive compounds of general formula (I) and more specifically of general formula (II) with commercially available [1-methyl-2-[(1,2,2-trimethyl-3-bi-cyclo[3.1.0]hexanyl)methyl]cyclopropyl]methanol (Javanol®, Givaudan) under acidic conditions.

In order to analyse the stability of the inventive compounds, different samples each containing 0.3% of either compound 3a, compound 3b or Javanol® (Givaudan), respectively, in a citric acid-based cleaner having a pH of 2 were analysed, i.e., the stability test was carried out using a representative acidic cleaner (pH=2) in which the corresponding fragrance compounds were incorporated in an amount of 0.3% relative to the acidic cleaner.

The stability was analysed via solid-phase microextraction (SPME) and coupled gas chromatography-mass spectrometry (GC-MS) by using a combination of polydimethylsiloxane and divinylbenzene as SPME fibre coating (PDMS/DVB fibre) and a polydimethylsiloxane-based DB-1 column for gas chromatography (100% polydimethylsiloxane) for each sample containing one of the fragrance compounds as indicated above. The stability was tested for various samples after 14 days of acidic treatment at different storage temperatures (6° C., 22° C., 40° C. and 50° C.) in comparison to a freshly prepared sample as reference (see FIGURE).

The results of said comparison are shown in FIGURE: As can be seen from the diagram, the inventive compounds 3a and 3b show a better acid-stability over the whole temperature range when treated under acidic conditions for 14 days. Best stabilities could be observed for samples treated under acidic conditions at a temperature of 22° C. for 14 days, and in particular for compound 3a at a temperature of 22° C., while Javanol® (Givaudan) seems to decompose quickly even at moderate temperatures upon treatment witch acidic medium and fully decomposes when treated under acidic conditions for 14 days at 50° C.

For example, also pH-balanced body wash products are adjusted to a pH of approximately 5.5. Upon showering or washing the water temperature is often set to temperatures of about 40° C. and the fragrance component should not decompose within the body wash formulation or upon usage of the body wash or other perfumed products. Also, human sweat is found to generally have a moderately acidic to neutral pH level and has typically a pH value of about 4.5. Moreover, the natural skin surface exhibits a pH being on average below 5. In addition, our skin is often exposed to higher temperatures such as from the sun (in particular in summer). These are only some of the multiply situations wherein a fragrance compound is exposed to acidic conditions and/or increased temperatures. However, based on the above experiment, it can be concluded that for the inventive compound of general formula (I) considerably higher stabilities are to be expected in such products or onto the skin compared to Javanol® (Givaudan), not resulting in an unpleasant odour or changed odour profile due to decomposition of the fragrance material or its reaction with other ingredients of the formulation and the formation of by-products, thus providing for a stable fragrance material (in particular under acidic conditions).

The increase in stability can be explained based on the position of the cyclopropanation within the side chain of the molecule relative to the group R (which is either a H or methyl group in compounds 3a and 3b, respectively, see compounds of general formula (II)): While the cyclopropane ring is located between the C-atoms marked as C2 and C3 in Javanol® (Givaudan), the cyclopropane ring within the butyl chain C1 to C4 is encompassing the C-atoms marked as C3 and C4 in reference to general formula (I) of the inventive compounds. However, in Javanol® (Givaudan) the C2 atom is already bond to either a methyl group, which in connection with the relatively high ring strain of the cyclopropane ring is likely to cause the instability of the molecule under acidic conditions and increasing temperatures and result in a decomposition of the fragrance material. The instability of the molecule upon exposure to high temperatures and acidic conditions results in a loss of the olfactoric properties and might cause unpleasant odours due to the decomposition products and/or interactions with other ingredients of the formulation.

The invention claimed is:

1. A compound of general formula (II):

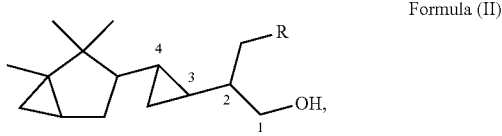

Formula (II)

wherein

R represents H or an alkyl group;

or a mixture of the above compounds;

or a stereoisomer of the above compounds or a mixture of these stereoisomers.

2. The compound according to claim 1, wherein the alkyl group is a methyl group.

3. The compound according to claim 1, wherein R represents a hydrogen atom.

4. The compound according to claim 1, wherein the compound is present in the form of:

(a) a pure optically active enantiomer;

(b) a racemic mixture of the enantiomers; or (c) an optically active mixture of various enantiomers.

5. A fragrance composition comprising at least one compound according to claim 1 and at least one further fragrance substance.

6. A method of improving the fixation of a fragrance compound in a composition or of preparing a perfumed product comprising formulating the composition or product with a compound of claim 1.

7. A perfumed product comprising a compound according to claim 1.

8. A perfumed product comprising a compound according to claim 1 in an amount effective to emanate a pleasant perceptible fragrance impression, and a carrier or substrate.

9. The perfumed product according to claim 7, wherein the perfumed product is a perfume oil, perfume base, formulation for personal hygiene, cleaning agent or air freshener.

10. The perfumed product according to claim 8, wherein the perfumed product is a perfume oil, perfume base, formulation for personal hygiene, cleaning agent or air freshener.

\* \* \* \* \*